United States Patent
Harnick et al.

(10) Patent No.: US 8,577,786 B1
(45) Date of Patent: Nov. 5, 2013

(54) SYSTEM AND METHOD FOR PROVIDING SYSTEMIC CASUALTY RESERVE PROTECTION

(75) Inventors: Michelle Harnick, New York, NY (US); Jose R. Couret, Cliffside Park, NJ (US); Priyantha L. Perera, Princeton, NJ (US)

(73) Assignee: Guy Carpenter & Company, LLC., New York, NY (US)

( * ) Notice: Subject to any disclaimer, the term of this patent is extended or adjusted under 35 U.S.C. 154(b) by 0 days.

(21) Appl. No.: 13/611,965

(22) Filed: Sep. 12, 2012

(51) Int. Cl.
 *G06Q 40/00* (2012.01)
(52) U.S. Cl.
 CPC ........................... *G06Q 40/00* (2013.01)
 USPC ............................................................ 705/37
(58) Field of Classification Search
 None
 See application file for complete search history.

(56) References Cited

U.S. PATENT DOCUMENTS

| | | | |
|---|---|---|---|
| 7,353,115 B2 * | 4/2008 | Bertogg et al. | 702/15 |
| 8,452,620 B1 * | 5/2013 | Grundfest | 705/4 |
| 2002/0178033 A1 * | 11/2002 | Yoshioka et al. | 705/4 |
| 2008/0103841 A1 * | 5/2008 | Lewis et al. | 705/4 |
| 2012/0271658 A1 * | 10/2012 | Sloan, III | 705/4 |

* cited by examiner

*Primary Examiner* — Bruce I Ebersman
(74) *Attorney, Agent, or Firm* — Fay Kaplun & Marcin, LLP

(57) ABSTRACT

A system, method and computer readable storage medium for calculating a first industry index amount at an index year based on selected loss values for the index year for a plurality of companies in a defined line of business and a predetermined number of years preceding the index year for the plurality of companies and loss estimates for a number of years subsequent to the index year corresponding to a predetermined term of a systemic risk product for the plurality of companies, calculating a second industry index amount based on selected loss values for the index year for the plurality of companies, a predetermined number of years preceding the index year for the plurality of companies and at least one year subsequent to the index year and calculating an industry index value based on the first and second industry index amount.

19 Claims, 11 Drawing Sheets

FIG. 3

| AY | 1 | 2 | 3 | 4 | 5 | 6 | 7 | 8 | 9 | 10 |
|---|---|---|---|---|---|---|---|---|---|---|
| 1989 | | | | | | | | | | 315,209 |
| 1990 | | | | | | | | | 366,988 | 312,892 |
| 1991 | | | | | | | | 459,701 | 327,228 | 280,239 |
| 1992 | | | | | | | 528,419 | 360,556 | 278,758 | 232,511 |
| 1993 | | | | | | 659,827 | 436,137 | 329,968 | 274,881 | 193,924 |
| 1994 | | | | | 809,192 | 532,569 | 357,438 | 322,997 | 199,233 | 169,079 |
| 1995 | | | | 1,169,724 | 728,126 | 480,875 | 381,798 | 246,554 | 177,544 | 150,672 |
| 1996 | | | 1,822,278 | 1,150,640 | 765,864 | 506,808 | 317,911 | 237,846 | 171,274 | 145,351 |
| 1997 | 2,986,866 | 3,366,272 | 1,973,721 | 1,188,030 | 785,806 | 483,099 | 333,563 | 249,556 | 179,706 | 152,507 |
| 1998 | 3,032,646 | 3,619,841 | 2,218,618 | 1,398,960 | 831,199 | 521,616 | 360,157 | 269,453 | 194,034 | 164,666 |
| 1999 | 3,135,073 | 4,028,725 | 2,479,833 | 1,375,237 | 882,581 | 553,861 | 382,421 | 286,110 | 206,028 | 174,845 |
| 2000 | | 4,017,972 | 2,328,226 | 1,286,380 | 889,733 | 558,348 | 385,520 | 288,428 | 207,698 | 176,262 |
| Δ% Paid | 0.23503 | 0.29863 | 0.17454 | 0.10393 | 0.06670 | 0.04186 | 0.02890 | 0.02162 | 0.01557 | 0.01321 |

| AY | Index at T=1 |
|---|---|
| 1992 | 232,511 |
| 1993 | 468,805 |
| 1994 | 691,309 |
| 1995 | 956,568 |
| 1996 | 1,379,191 |
| 1997 | 2,031,729 |
| 1998 | 3,381,384 |
| 1999 | 5,673,933 |
| 2000 | 9,180,658 |
| Σ | 23,996,090 |

| AY | 1 | 2 | 3 | 4 | 5 | 6 | 7 | 8 | 9 | 10 |
|---|---|---|---|---|---|---|---|---|---|---|
| 1989 | | | | | | | | | | 315,209 |
| 1990 | | | | | | | | | 366,988 | 312,892 |
| 1991 | | | | | | | | 459,701 | 327,228 | 280,239 |
| 1992 | | | | | | | 528,419 | 360,556 | 278,758 | 232,511 |
| 1993 | | | | | | 659,827 | 436,137 | 329,968 | 274,881 | 188,337 |
| 1994 | | | | | 809,192 | 532,569 | 357,438 | 322,997 | 125,927 | 275,223 |
| 1995 | | | | 1,169,724 | 728,126 | 480,875 | 381,798 | 224,732 | 230,903 | 151,591 |
| 1996 | | | 1,822,278 | 1,150,640 | 765,864 | 506,808 | 350,200 | 280,906 | 136,901 | 210,936 |
| 1997 | | 3,366,272 | 1,973,721 | 1,188,030 | 785,806 | 523,619 | 403,111 | 390,746 | 270,606 | 152,507 |
| 1998 | 2,986,866 | 3,619,841 | 2,218,618 | 1,398,960 | 915,905 | 639,719 | 730,666 | 429,177 | 194,034 | 164,666 |
| 1999 | 3,032,646 | 4,028,725 | 2,479,833 | 1,598,585 | 1,047,961 | 938,620 | 730,681 | 286,110 | 206,028 | 174,845 |
| 2000 | 3,135,073 | 4,017,972 | 2,497,424 | 1,598,693 | 1,129,257 | 820,321 | 385,520 | 288,428 | 207,698 | 176,262 |
| Δ% Paid | 0.23503 | 0.29863 | 0.17454 | 0.10393 | 0.06670 | 0.04186 | 0.02890 | 0.02162 | 0.01557 | 0.01321 |

400

410

| AY | Index at T=5 |
|---|---|
| 1992 | 232,511 |
| 1993 | 463,218 |
| 1994 | 724,147 |
| 1995 | 989,023 |
| 1996 | 1,485,751 |
| 1997 | 2,373,888 |
| 1998 | 4,114,427 |
| 1999 | 6,683,679 |
| 2000 | 10,063,667 |
| Σ | 27,130,311 |

Gross Paid Loss & DCC at 12/31/2004 (as Reported) — 600

| AY | 1 | 2 | 3 | 4 | 5 | 6 | 7 | 8 | 9 | 10 |
|---|---|---|---|---|---|---|---|---|---|---|
| 1992 | | | | | | | | | | 22,195 |
| 1993 | | | | | | | | | 31,287 | 31,375 |
| 1994 | | | | | | | | 18,734 | 18,773 | 18,788 |
| 1995 | | | | | | | 11,444 | 11,945 | 12,426 | 12,430 |
| 1996 | | | | | 11,810 | 14,292 | 16,979 | 17,562 | | |
| 1997 | | | | 14,264 | 17,558 | 19,934 | 22,277 | | | |
| 1998 | | | 26,612 | 32,450 | 35,938 | 40,964 | | | | |
| 1999 | | 19,878 | 30,028 | 35,893 | 44,718 | | | | | |
| 2000 | | 1,723 | 4,648 | 8,186 | | | | | | |
| 2001 | 25 | 247 | 1,389 | 5,780 | | | | | | |
| 2002 | 36 | 521 | 3,435 | | | | | | | |
| 2003 | 15 | 767 | | | | | | | | |
| 2004 | 20 | | | | | | | | | |

602  604

Incremental Gross Paid Loss & DCC at 12/31/2004 (Before Adjustment) — 610

| AY | 1 | 2 | 3 | 4 | 5 | 6 | 7 | 8 | 9 | 10 |
|---|---|---|---|---|---|---|---|---|---|---|
| 1995 | | | | | | | | | | 4 |
| 1996 | | | | | | | | | 583 | |
| 1997 | | | | | | | | 2,343 | | |
| 1998 | | | | | | | 5,026 | | | |
| 1999 | | | | | | 8,825 | | | | |
| 2000 | | | | | 3,538 | | | | | |
| 2001 | | | | 4,391 | | | | | | |
| 2002 | | | 2,914 | | | | | | | |
| 2003 | | 752 | | | | | | | | |
| 2004 | 20 | | | | | | | | | |

612

| AY | \multicolumn{10}{c}{Gross Premium at 12/31/2004} | | | | | | | | | |
|---|---|---|---|---|---|---|---|---|---|---|
| | 1 | 2 | 3 | 4 | 5 | 6 | 7 | 8 | 9 | 10 |
| 1992 | | | | | | | | | | 11,025 |
| 1993 | | | | | | | | | 15,142 | 15,142 |
| 1994 | | | | | | | | 10,493 | 10,493 | 10,493 |
| 1995 | | | | | | | 10,511 | 10,511 | 10,511 | 10,511 |
| 1996 | | | | | | 14,418 | 14,418 | 14,418 | 14,418 | |
| 1997 | | | | | 14,962 | 14,962 | 14,962 | 14,962 | | |
| 1998 | | | | 16,592 | 16,592 | 16,592 | 16,592 | | | |
| 1999 | | | 12,235 | 12,235 | 12,235 | 12,235 | | | | |
| 2000 | 10,409 | 10,409 | 10,409 | 10,409 | | | | | | |
| 2001 | 14,967 | 14,967 | 14,967 | | | | | | | |
| 2002 | 7,140 | 7,140 | 6,962 | | | | | | | |
| 2003 | 24,705 | 24,705 | | | | | | | | |
| 2004 | 18,815 | | | | | | | | | |

FIG. 7

| AY | 2:1 | 3:2 | 4:3 | 5:4 | 6:5 | 7:6 | 8:7 | 9:8 | 10:9 |
|---|---|---|---|---|---|---|---|---|---|
| | Age-to-Age Factors Before Adjustment | | | | | | | | |
| 1993 | | | | | | | | | |
| 1994 | | | | | | | | | 1.000 |
| 1995 | | | | | | | | 1.034 | |
| 1996 | | | | | | | 1.118 | | |
| 1997 | | | | | | 1.140 | | | |
| 1998 | | | | | 1.246 | | | | |
| 1999 | | | | 1.761 | | | | | |
| 2000 | | | 4.161 | | | | | | |
| 2001 | | 6.593 (805) | | | | | | | |
| 2002 | | | | | | | | | |
| 2003 | 51.133 | | | | | | | | |

| AY | 2:1 | 3:2 | 4:3 | 5:4 | 6:5 | 7:6 | 8:7 | 9:8 | 10:9 |
|---|---|---|---|---|---|---|---|---|---|
| | Age-to-Age Factors After Adjustment | | | | | | | | |
| 1993 | | | | | | | | | |
| 1994 | | | | | | | | | 1.000 |
| 1995 | | | | | | | | 1.034 | |
| 1996 | | | | | | | 1.118 | | |
| 1997 | | | | | | 1.140 | | | |
| 1998 | | | | | 1.246 | | | | |
| 1999 | | | | 1.761 | | | | | |
| 2000 | | | 4.161 | | | | | | |
| 2001 | | (6.762) (815) | | | | | | | |
| 2002 | | | | | | | | | |
| 2003 | 51.133 | | | | | | | | |

FIG. 8

Gross Paid Loss & DCC at 12/31/2004 (Adjusted)

| AY | 1 | 2 | 3 | 4 | 5 | 6 | 7 | 8 | 9 | 10 |
|---|---|---|---|---|---|---|---|---|---|---|
| 1992 | | | | | | | | | | 22,195 |
| 1993 | | | | | | | | | 31,287 | 31,375 |
| 1994 | | | | | | | | 18,734 | 18,773 | 18,788 |
| 1995 | | | | | | | 11,444 | 11,945 | 12,426 | 12,430 |
| 1996 | | | | | | 11,810 | 14,292 | 16,979 | 17,562 | |
| 1997 | | | | | 14,264 | 17,558 | 19,934 | 22,277 | | |
| 1998 | | | 19,878 | 26,612 | 32,450 | 35,938 | 40,964 | | | |
| 1999 | | | 1,723 | 30,028 | 35,893 | 44,718 | | | | |
| 2000 | 25 | 470 | 1,389 | 4,648 | 8,186 | | | | | |
| 2001 | 36 | 247 | 3,523 | 5,780 | | | | | | |
| 2002 | 15 | 521 | | | | | | | | |
| 2003 | 20 | 767 | | | | | | | | |
| 2004 | | | | | | | | | | |

Incremental Gross Paid Loss & DCC at 12/31/2004 (After Adjustment)

| AY | 1 | 2 | 3 | 4 | 5 | 6 | 7 | 8 | 9 | 10 |
|---|---|---|---|---|---|---|---|---|---|---|
| 1995 | | | | | | | | | | 4 |
| 1996 | | | | | | | | | 583 | |
| 1997 | | | | | | | | 2,343 | | |
| 1998 | | | | | | | 5,026 | | | |
| 1999 | | | | | | 8,825 | | | | |
| 2000 | | | | | 3,538 | | | | | |
| 2001 | | | | 4,391 | | | | | | |
| 2002 | | | 3,002 | | | | | | | |
| 2003 | | 752 | | | | | | | | |
| 2004 | 20 | | | | | | | | | |

| (1) | (2) | (3) | (4) | (5) | (6) | (7) | (8) | (9) |
|---|---|---|---|---|---|---|---|---|
| Combo | 1st Report Loss | 2nd Report Loss | Actual (3)/(2) | Adj | Default | Deviation | Flag | Selected |
| 914 | 395,487 | 593,103 | 1.4997 | 1.0609 | 2.6523 | (0.4346) | 1.0000 | 2.6523 |
| 841 | 42,114 | 82,093 | 1.9493 | 1.0542 | 2.6355 | (0.2604) | 1.0000 | 2.6355 |
| 3034 | 3,914 | 7,549 | 1.9286 | 1.0104 | 2.5261 | (0.2365) | - | 1.9286 |
| 7080 | 67,131 | 107,875 | 1.6069 | 0.8214 | 2.0535 | (0.2175) | - | 1.6069 |
| 3360 | 67,805 | 145,077 | 2.1396 | 1.0873 | 2.7181 | (0.2128) | - | 2.1396 |
| 2186 | 102,430 | 230,600 | 2.2513 | 1.1224 | 2.8061 | (0.1977) | - | 2.2513 |
| 626 | 73,035 | 160,303 | 2.1949 | 1.0691 | 2.6727 | (0.1788) | - | 2.1949 |
| 629 | 1 | 2 | 2.1567 | 1.0342 | 2.5855 | (0.1658) | - | 2.1567 |
| 1694 | 48,633 | 99,881 | 2.0538 | 0.9406 | 2.3514 | (0.1266) | - | 2.0538 |
| 760 | 21,551 | 51,231 | 2.3772 | 1.0798 | 2.6996 | (0.1194) | - | 2.3772 |
| 623 | 23,572 | 54,553 | 2.3143 | 1.0249 | 2.5623 | (0.0968) | - | 2.3143 |
| 884 | 30,345 | 70,166 | 2.3123 | 1.0198 | 2.5496 | (0.0931) | - | 2.3123 |
| 70 | 471,080 | 942,160 | 2.0000 | 0.8100 | 2.0250 | (0.0123) | - | 2.0000 |
| 2135 | 44,548 | 107,866 | 2.4213 | 0.9275 | 2.3188 | 0.0442 | - | 2.4213 |
| 2429 | 43,610 | 114,950 | 2.6359 | 0.9946 | 2.4866 | 0.0600 | - | 2.6359 |
| 1112 | 698,439 | 1,848,333 | 2.6464 | 0.9943 | 2.4857 | 0.0646 | - | 2.6464 |
| 2127 | 320,487 | 924,161 | 2.8836 | 1.0792 | 2.6980 | 0.0688 | - | 2.8836 |

| | | | | From FIG. 11A | | |
|---|---|---|---|---|---|---|
| 124 | 575,594 | 1,426,127 | 2.4777 | 0.9180 | 2.2949 | 0.0796 | - | 2.4777 |
| 36196 | 85,352 | 229,392 | 2.6876 | 0.9600 | 2.4000 | 0.1198 | - | 2.6876 |
| 2011 | 19,412 | 57,895 | 2.9824 | 1.0445 | 2.6113 | 0.1421 | - | 2.9824 |
| 698 | 58,597 | 200,221 | 3.4169 | 1.1834 | 2.9585 | 0.1550 | - | 3.4169 |
| 1767 | 27,673 | 84,743 | 3.0623 | 1.0588 | 2.6470 | 0.1569 | - | 3.0623 |
| 2534 | 17,245 | 50,631 | 2.9360 | 1.0100 | 2.5251 | 0.1627 | - | 2.9360 |
| 2801 | 63,711 | 186,699 | 2.9304 | 1.0057 | 2.5142 | 0.1656 | - | 2.9304 |
| 388 | 75,319 | 243,058 | 3.2270 | 1.0966 | 2.7415 | 0.1771 | - | 3.2270 |
| 4731 | 8,555 | 24,930 | 2.9140 | 0.9457 | 2.3643 | 0.2325 | - | 2.9140 |
| 6807 | 46,880 | 161,057 | 3.4355 | 1.0761 | 2.6901 | 0.2771 | - | 3.4355 |
| 2283 | 26,844 | 102,445 | 3.8163 | 1.0170 | 2.5426 | 0.5010 | - | 3.8163 |
| 4740 | 65,743 | 259,683 | 3.9500 | 1.0510 | 2.6275 | 0.5033 | - | 3.9500 |
| 78 | 25,664 | 91,661 | 3.5716 | 0.9501 | 2.3751 | 0.5037 | - | 3.5716 |
| 18767 | 13,215 | 50,000 | 3.7836 | 0.9233 | 2.3084 | 0.6391 | - | 3.7836 |
| 442 | 11,839 | 45,000 | 3.8010 | 0.8498 | 2.1245 | 0.7891 | 1.0000 | 2.1245 |
| 2445 | 65,553 | 350,000 | 5.3392 | 0.9949 | 2.4873 | 1.1465 | 1.0000 | 2.4873 |
| Weighted | 3,641,378 | 9,103,445 | 2.5000 | | | | | |

SYSTEM AND METHOD FOR PROVIDING SYSTEMIC CASUALTY RESERVE PROTECTION

BACKGROUND INFORMATION

A customer of an insurance company or a reinsurance company pays the (re)insurance company a premium to bind a (re)insurance policy for the customer. The (re)insurance policy allows the customer to make a claim against the (re)insurance company for a covered amount when the customer suffers a loss covered by the (re)insurance policy. The (re)insurance company is generally required by law or insurance regulation to keep a certain amount of the premium payment available to pay anticipated losses. These funds that are set aside to pay later losses are referred to as loss reserves.

(Re)insurance companies may also hedge their risk on a (re)insurance policy by using other financial instruments related to the entire (re)insurance industry, such as CAT bonds or industry loss warranties ("ILWs"). These industry-based or index-based securities generally use industry losses as a trigger mechanism for payout of a specified amount of money to a (re)insurance company or other insured entity. It is noted that throughout this description when the term "security" or "securities" is used it refers to the reinsurance or ILW instruments, which may or may not be a security as that term is defined by law. An ILW contract is a manner through which one party will purchase protection based on the total loss arising from an event or series of events to the entire (re)insurance industry rather than its individual loss. The maximum amount of protection offered by the contract is referred to as the "limit." The industry loss threshold whose exceedance results in a payment under the contract for as much as the limit is referred to as the "trigger." To provide a specific example, an insurance company may purchase a contract having a limit of $200 million that is payable upon an industry loss event of $25 billion (the trigger). That is, if an event occurs (e.g., an earthquake) where the total industry loss exceeds $25 billion, the insurance company will receive a payment up to a limit of $200 million, regardless of actual losses suffered by the insurance company during the event.

However, there are no effective instruments that are offered to hedge an insurance company's risk for casualty lines of business based on systemic risks, e.g., those risks that are of, relating to, or common to the entire system and experienced across and entire line of business or the entire industry. An example of systemic risk is aggregation risk, which is an exposure concentration affecting similar types of risks or a particular coverage involving multiple accident years arising out of a particular product, substance or some common causative factor such as a design, business activity, error or omission. Other examples of systemic risk include a new legal theory, a new coverage interpretation, liability arising out of a relatively new or existing product or technology, changes in the macroeconomic conditions (e.g., medical inflation driven by a costly new technology or unforeseen cost shifts associated with universal health insurance), changes in the regulatory environment or other unforeseen causes that affect the entire industry.

There are several reasons that these security products do not exist to deal with systemic risk, including moral hazard (e.g., the hazard associated with the individual company's ability to manipulate reserves), high capital charges associated with the long tailed (slow to settle) lines of business (make it uneconomic for reinsurers to write), and significant underwriting expense and due diligence and market reservations to write casualty due to external factors including social, economic and political influences.

SUMMARY OF THE EXEMPLARY EMBODIMENTS

A first exemplary embodiment is directed to a method for calculating a first industry index amount at an index year based on selected loss values for the index year for a plurality of companies in a defined line of business and a predetermined number of years preceding the index year for the plurality of companies and loss estimates for a number of years subsequent to the index year corresponding to a predetermined term of a systemic risk product for the plurality of companies; calculating a second industry index amount based on selected loss values for the index year for the plurality of companies, a predetermined number of years preceding the index year for the plurality of companies and at least one year subsequent to the index year and calculating an industry index value based on the first and second industry index amount.

A second exemplary embodiment is directed to a system having a memory storing a set of instructions and a processor executing the set of instructions to perform a method. The method including calculating a first industry index amount at an index year based on selected loss values for the index year for a plurality of companies in a defined line of business and a predetermined number of years preceding the index year for the plurality of companies and loss estimates for a number of years subsequent to the index year corresponding to a predetermined term of a systemic risk product for the plurality of companies, calculating a second industry index amount based on selected loss values for the index year for the plurality of companies, a predetermined number of years preceding the index year for the plurality of companies and at least one year subsequent to the index year and calculating an industry index value based on the first and second industry index amount.

A further exemplary embodiment is directed to a non-transitory computer readable storage medium comprising a set of instructions that are executable by a processor to perform a method. The method including calculating a first industry index amount at an index year based on selected loss values for the index year for a plurality of companies in a defined line of business and a predetermined number of years preceding the index year for the plurality of companies and loss estimates for a number of years subsequent to the index year corresponding to a predetermined term of a systemic risk product for the plurality of companies, calculating a second industry index amount based on selected loss values for the index year for the plurality of companies, a predetermined number of years preceding the index year for the plurality of companies and at least one year subsequent to the index year and calculating an industry index value based on the first and second industry index amount.

BRIEF DESCRIPTION OF THE DRAWINGS

FIG. 3 shows an exemplary updated index one year forward based on updated actual payments for the next calendar year and projected initial payments for the next four calendar years following the next year using the data from FIG. 1 for the index year 2000. Other interim values of the index would be based on the same procedure but would include more years of actual payments. For example, the index two years forward would be based on two calendar years of actual payments and three years of projected payments (as originally calculated).

FIG. 4 shows an exemplary final value of the index based on updated actual payments after five years for the index year 2000.

FIG. 6 shows a gross paid loss table that has gross paid loss values from various annual reports and an incremental paid loss table that is calculated from the gross paid loss table.

FIG. 7 illustrates a table showing gross premiums that correspond to the same time periods as the gross loss paid values in the gross paid loss table of FIG. 6.

FIG. 8 shows a first table illustrating unadjusted age-to-age factors based on the gross paid loss table values of FIG. 6 and a second table illustrating adjusted age-to-age factors based on an adjustment calculation.

FIG. 9 shows an adjusted gross paid loss table based on the gross paid loss table of FIG. 6 and the adjusted age-to-age factors of FIG. 8.

FIG. 10 shows an adjusted incremental paid loss table based on the adjusted gross paid loss table of FIG. 9.

FIG. 11A shows a first portion of exemplary calculated default factors for use when observed factors fail consistency checks.

FIG. 11B shows a second portion of the exemplary calculated default factors for use when observed factors fail consistency checks, as illustrated in FIG. 11A.

DETAILED DESCRIPTION

Figure 1:
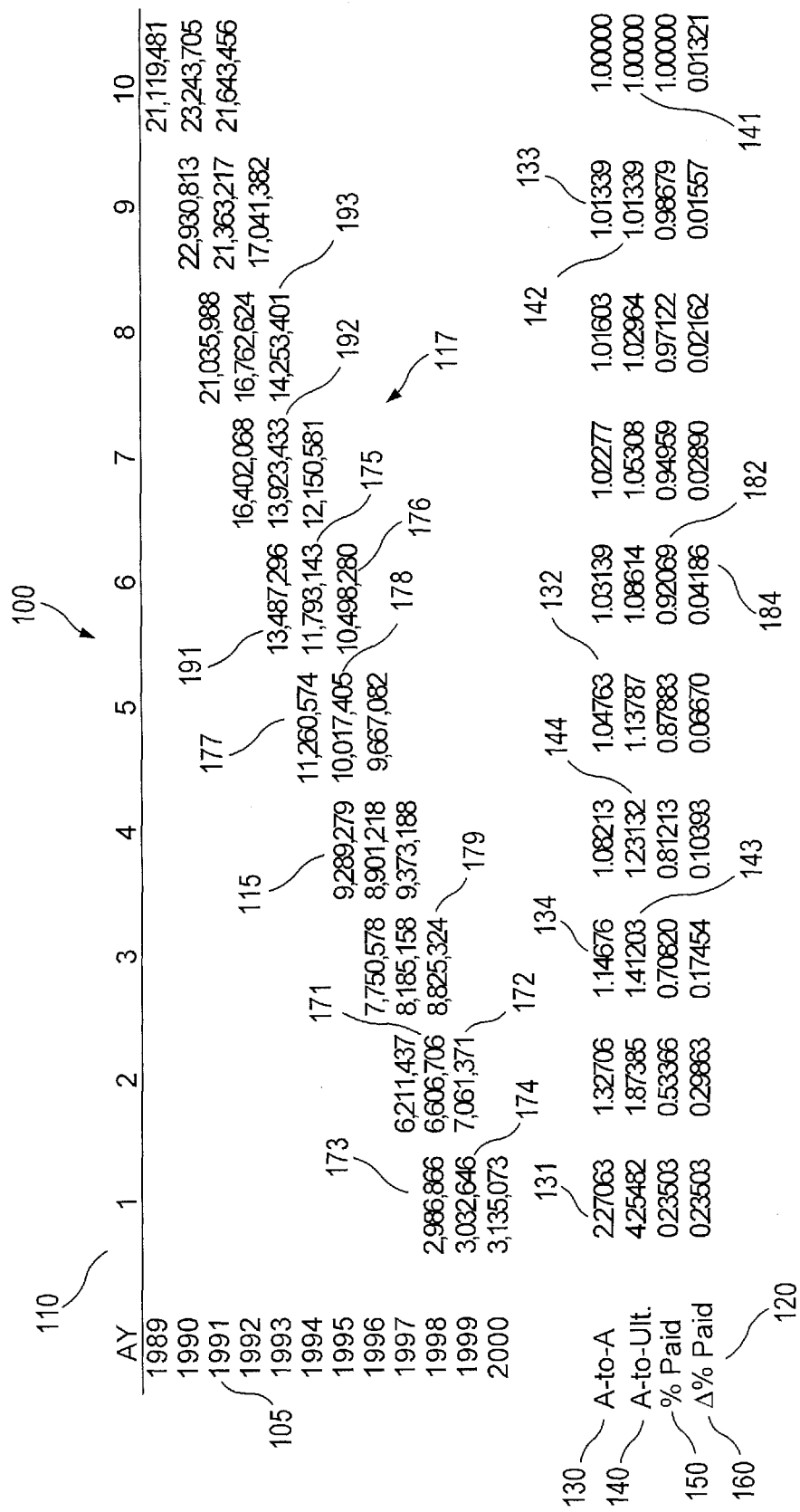
FIG. 1 shows an exemplary derivation of a cumulative payment pattern (labeled % Paid) and incremental payment pattern (labeled Δ % Paid) using a 2-year weighted average paid chain ladder method. The estimate corresponds to index year 2000. The payment patterns and the loss amounts used in their derivation serve as inputs into the calculation of the index.

The exemplary embodiments may be further understood with reference to the following description of the exemplary embodiments and the related appended drawings, wherein like elements are provided with the same reference numerals. The exemplary embodiments are related to systems and methods for providing systemic casualty reserve protection. Specifically, the exemplary embodiments provide a product based on an industry index to hedge against systemic risk (hereinafter referred to as the "systemic risk product"). The following will provide a description of the systemic risk product, a manner of calculating the proprietary industry index, and a manner of calculating the payoff if the trigger is satisfied subject to the other terms and conditions of the systemic risk product.

Throughout this description it will be described that an insurance company will be the purchaser of the systemic risk product to hedge its risk against systemic risk. However, those skilled in the art will recognize that other entities may also be the purchaser of the systemic risk product. For example, as described above, reinsurers may have the same issues as insurance companies, thus, a reinsurer may be the purchaser of the systemic risk product. In another example, a company may self insure against certain risks. This company may be the purchaser of the exemplary systemic risk product. Thus, it should be understood that the term "insurance company" is not limited to the traditional definition of that term. As will be noted below, the exemplary systemic risk product may be in the form of a reinsurance product or an ILW product. Thus, throughout this description, where the term "reinsurer" is used, it is meant to refer to any entity that is the seller of the exemplary systemic risk product, not only entities that engage in the reinsurance business as that business is understood by those skilled in the art.

Insurance companies use various actuarial techniques to estimate their paid losses for upcoming calendar years. These techniques may include, for example, chain ladder models, generalized linear models (GLM's), etc. Based on these techniques, the insurance companies estimate and set aside the proper loss reserves to eventually pay out for any actual losses suffered by the insured parties. Empirical data indicates that calendar year trends for actual paid losses tend to be cyclical and that all insurance companies in a particular line of business tend to move in tandem. While there is always the possibility of outliers, e.g., a particular insurance company has written policies that suffer losses based on a particular event while another insurance company does not have exposure to a particular event, etc., the data supports the proposition of the general rule that losses in individual lines of business tend to move in the same direction for all companies writing policies in that line of business. This leads to a conclusion that systemic losses that are spread throughout the entire industry will impact an individual company. These systemic losses cannot be accounted for by the actuarial techniques because the data relating to such systemic losses is not typically observed in the historical data because the data does not capture unforeseen and/or extremely rare events. Some examples of systemic risk or causes of systemic losses were provided above. The particular reason for a systemic loss is not important, because in most cases, it is not foreseeable and therefore cannot be built accurately into the models. Most insurance companies know or intuitively know that the systemic risk exists and desire to hedge their exposure to the risk. However, as described above, there is no well-designed synthetic product available for such a hedge.

The exemplary systemic risk product described herein provides a mechanism for an effective hedge against adverse developments in unpaid losses driven by systemic shocks to the system or the industry as a whole. Thus, the purpose of the systemic risk product is to protect the insurance company against systemic events, not firm specific risk. For this reason, the systemic risk product is based on an industry index, e.g., a plurality of companies that represent the industry. The industry index may be generally described as a ratio of actual paid losses against projected paid losses, although other data points may be used. An exemplary calculation of an index is provided below.

It has been found that the industry development trends have better predictability than an individual insurance company's development trends. Further, the industry index based on paid loss data eliminates the moral hazard associated with any individual company's reserving practices, e.g., the carried reserves of any individual company do not influence the systemic risk product.

Each insurance company is required to file a Schedule P for its line of businesses that includes paid loss data. Thus, the index that is used for the exemplary systemic risk product described herein is based on publicly available paid loss data for each of the insurance companies in the index. Since all the underlying data for the calculation is publicly available data, the calculation is verifiable, transparent and there is little or no due diligence required on individual companies, thereby expediting the process.

In general, the industry index that is used for the exemplary systemic risk product described herein does not require a calculation to be performed for each insurance company. Once the index has been calculated and verified, the same index may be used for any insurance company wishing to purchase a cover for the line of business for which the index was calculated. It should be noted that the industry index is flexible and may be modified to improve the hedge for individual insurance companies or groups of insurance companies. In one example, the paid loss data used to calculate the index may be gross paid loss data, whereas in another example the paid loss data may be net paid loss data. In a further example, a specific insurance company may have certain overweight geographical exposures (e.g., California, Illinois and Florida), the industry index may be modified to more closely match this geographical overweight exposure of the insurance company to improve the hedging effect of the systemic risk product.

Those skilled in the art will understand that the Schedule P filing has ten (10) years worth of paid loss data. Thus, the exemplary calculation provided below shows the calculation based on the most current ten (10) years of publicly available paid loss data based on the Schedule P filings. However, historical years may be retained such that more than ten (10) years of data may be used in the calculation. Another point of flexibility of the systemic risk product is that it may have any term from 1-9 years. The exemplary calculation provided below will assume a term of five (5) years, but the term could also be 2 years, 3 years, 7 years, etc.

The exemplary systemic risk product that is based on the index calculation may be a reinsurance product and/or an ILW product. The exemplary calculation provided below will be for a reinsurance product, but characteristics of an exemplary ILW product will also be provided. A general description of the systemic risk product is a synthetic adverse development cover that includes an accelerated formulaic mandatory commutation feature allowing for commutation after a defined term of 1-9 years. As described above, the systemic risk product is based on an industry index calculated from Schedule P paid loss data and is designed to cover the systemic contribution to company adverse development.

The exemplary methods of calculating the industry index and the corresponding payoffs for the systemic risk product that are described below may be advantageously implemented using one or more computer programs executed on a computer system having a processor or central processing unit, such as, for example, a computer using an Intel-based CPU, such as a Pentium or Centrino, running an operating system such as the WINDOWS or LINUX operating systems, having non-transitory storage mediums, such as, a hard drive, RAM, ROM, a compact disc, magneto-optical storage device, and/or fixed or removable media, and having a one or more user interface devices, such as, for example, computer terminals, personal computers, laptop computers, and/or handheld devices, with an input means, such as, for example, a keyboard, mouse, pointing device, and/or microphone. The methods may also be implemented via a server executing a computer program and having users remotely access the results generated by the server for display on their personal devices, e.g., over the Internet, a company intranet, cloud computing devices and/or services, etc.

The following provides an exemplary index calculation and reinsurance systemic risk product based on a worker's compensation line of business. In this example, ABC insurance company has a $500M portfolio of workers compensation reserves and the company's management wants coverage for a systemic shock on these reserves. Thus, a reinsurer will develop a systemic risk product for the workers compensation line of business by calculating an industry index and negotiating and/or offering several other terms to ABC insurance company, which will be described below. The ABC insurance company may then elect to purchase the systemic risk product for the workers compensation line of business.

In this example, the exemplary index provided below is based on thirty-six (36) large workers compensation insurance writers that made up 60% of the industry based on premium volume in 2009. From this example, it can be seen that the index is based on a substantial number (but not all) of companies in the industry. There is no specific threshold of a required number of companies or premium volume within the index, but it should be clear that the higher the number and/or volume within the index, the more accurate the index will be for the purpose of hedging against systemic risk. Also, while the example used throughout this description is based on the workers compensation line of business, the exemplary embodiments may be applied to any Schedule P defined line of business, e.g., homeowners insurance, private passenger auto, medical malpractice, other liability occurrence, etc.

The commutation amount of the systemic risk product is calculated based upon the final value of the industry index and the paid losses of ABC insurance company. In this example, it is considered that the parties have negotiated a limit of $200M and a retention of $600M. In the scenario of the reinsurance systemic risk product, the parties have also negotiated a dual trigger and corresponding values to activate the cover. In this example, ABC insurance company reserves must develop by $50M (10% of the $500M reserve described above) and the index value at year 5 expressed as a ratio to the initial index value must exceed an index trigger of 1.10. The index trigger and an exemplary manner of calculating the index trigger value are described below.

In this example, the estimation of the outstanding losses for payment at commutation (e.g., end of the defined 5 year term) is based on the index year 2000. The selection of the year 2000 is merely for illustrative purposes and any index year may be selected. The formula for outstanding loss or commutation amount (CA) in the layer based on the above-described parameters is calculated as follows:

$$CA = Min(Max(I(5)-1.1,0), 0.1) \times \$2B$$

where,

I(5) is the index value at year 5 expressed as a ratio to the initial index value (as described above, the exemplary systemic risk product has a selected term of 5 years in this example), the value 1.1 is based on the negotiated index trigger point of 1.1, the value 0.1 is the negotiated index limit, and the $2B value is a scalar that is negotiated to convert the index value to a monetary value.

Exemplary calculations using this formulas will be provided below. Those skilled in the art will understand that the values and parameters used above are only exemplary and that different sellers and/or buyers of a systemic risk product may use and/or negotiate different values and parameters.

FIG. 1 shows an exemplary 2-year weighted average paid chain ladder estimate triangle 100 for the index year 2000 as described above. This exemplary data will be used to show an exemplary calculation of the industry index on which the systemic risk product is to be based. Again, it is noted that using a 2-year weighted average is only exemplary and other time frames and method may also be used, e.g., 3-year weighted average, 5-year straight average, etc. Initially, the column 105 shows the accident years from 1989-2000 and the row 110 shows the development years from year 1-10. The values in the triangle 100 represent the actual cumulative paid loss values for the business line as of Dec. 31, 2000, e.g., workers compensation. For example, for accident year 1998, after development year 1 (Dec. 31, 1998), a cumulative total 173 of $2,986,866 has been paid, after development year 2 (Dec. 31, 1999), a cumulative total 171 of $6,606,706 has been paid and after development year 3 (Dec. 31, 2000) a cumulative total 179 of $8,825,324 has been paid. In another example, for accident year 1993, after development year 6 (Dec. 31, 1998), a cumulative total 191 of $13,487,296 has been paid, after development year 7 (Dec. 31, 1999), a cumulative total 192 of $13,923,433 has been paid and after development year 8 (Dec. 31, 2000), a cumulative total 193 of $14,253,401 has been paid. As described above, the values in this upper left portion 115 of the triangle 100 are actual cumulative paid loss values that have been extracted from Schedule P filings for a number of insurance companies in the workers compensation line of business. As described previously, in this example, the values are based on thirty-six (36) workers compensation insurance writers that made up 60% of the industry based on premium volume in 2009.

As shown in FIG. 1, the bottom right portion 117 is the forecast period for which there are no actual paid values at this time (assuming it is Dec. 31, 2000). The calculation of these forecast values that will be filled in the bottom right portion 117 will be discussed in greater detail below.

FIG. 1 also includes a table 120 that shows an age-to-age (ATA) factor 130, an age-to-ultimate (ATU) factor 140, a cumulative percentage paid factor 150 and an incremental percentage paid factor 160 for each of the corresponding development years. Each of these factors and the calculation of their corresponding values 130-160 will be described. The ATA factor 130 is the change in payments made on a defined set of claims between successive points in time. In this example, this change is measured based on a two-year weighted average of successive accident years and successive development years. For example, the first ATA factor value 131 of 2.27063 is calculated by adding the values for the second year of development of accident year 1998 (value 171 of 6,606,706) and accident year 1999 (value 172 of 7,061,371) to give a total of 13,668,077. Then, the values for the previous (first) year of development of accident year 1998 (value 173 of 2,986,866) and accident year 1999 (value 174 of 3,032,646) are added resulting in the summed value of 6,019,512. The first summed value is then divided by the second summed value to calculate the ATA factor value 131 (13,668,077/6,019,512=2.27063). A second exemplary calculation of the ATA factor value 132 will be performed to provide a further example. In this example, the values for the sixth year of development of accident year 1994 (value 175 of 11,793,143) and accident year 1995 (value 176 of 10,498,280) are summed to give a total of 22,291,423. Then, the values for the previous (fifth) year of development of accident year 1994 (value 177 of 11,260,574) and accident year 1995 (value 178 of 10,017,405) are added resulting in the summed value of 21,277,979. The first summed value is then divided by the second summed value to calculate the ATA factor value 132 (22,291,423/21,277,979=1.04763). The remaining ATA factors 130 may be calculated in the same manner.

The ATU factor 140 is the cumulated ATA factors 130. In this example, it is considered that the ultimate payment amount occurs at year 10 of development, e.g., there is no paid development after year 10. Thus, the ATU factor value corresponding to development year 10 is unity as shown by the ATU factor value 141. The remaining ATU factor 140 values for any development year may be calculated by multiplying the ATA factor 130 value of the development year of interest by the ATU factor 140 value of the next development year. Thus, to calculate the ATU factor value 142 of 1.01339 for development year 9, the ATA factor value 133 of 1.01339 of the same development year is multiplied by the ATU factor value 141 of 1.00000 of the next development year 10, resulting in the ATU factor value 142 of 1.01339. To provide a further example, the ATU factor value 143 of 1.41203 for development year 3 is calculated by multiplying the ATA factor value 134 of 1.14676 of development year 3 by the ATU factor value 144 of 1.23132 of development year 4. Again, the remaining ATU factors may be calculated in the same manner.

The cumulative percentage paid factor 150 is the cumulative percentage of the amount paid in the development year against the projected ultimate cumulative amount paid. Thus, the amounts paid in development year 1 are projected to be approximately 23.5% (0.23503) of the ultimate cumulative paid amount. The cumulative amounts paid through development year 2 are projected to be approximately 53% (0.53366) of the ultimate cumulative paid amount. The cumulative paid factor at each report is the reciprocal of the ATU Factor; that is, it is calculated by dividing one by the ATU factor.

The incremental percentage paid factor 160 is the difference from development year to development year in the cumulative percentage paid factor 150. Thus, as described above, the percentage paid factor values for development years 2 and 1 are 0.53366 and 0.23503, respectively. Subtracting the value of development year 1 from the value of development year 2 results in (0.53366−0.23503=0.29863) which is the value for development year 2 for the incremental percentage paid factor 160. Again, the remaining incremental percentage paid factor 160 values may be calculated in the same manner.

The meaning of the exemplary data presented by the triangle 100 and table 120 will be described. In an example, accident year 1995 is selected. Through the sixth development year, a cumulative total of $10,498,280M has been paid as shown by value 176. This cumulative paid value 176 represents approximately 92.07% of the cumulative paid loss projected through development year 10 as shown by the value 182. In development year 6, approximately 4.186% of the ultimate cumulative paid loss will be paid as shown by the value 184.

Figure 2:
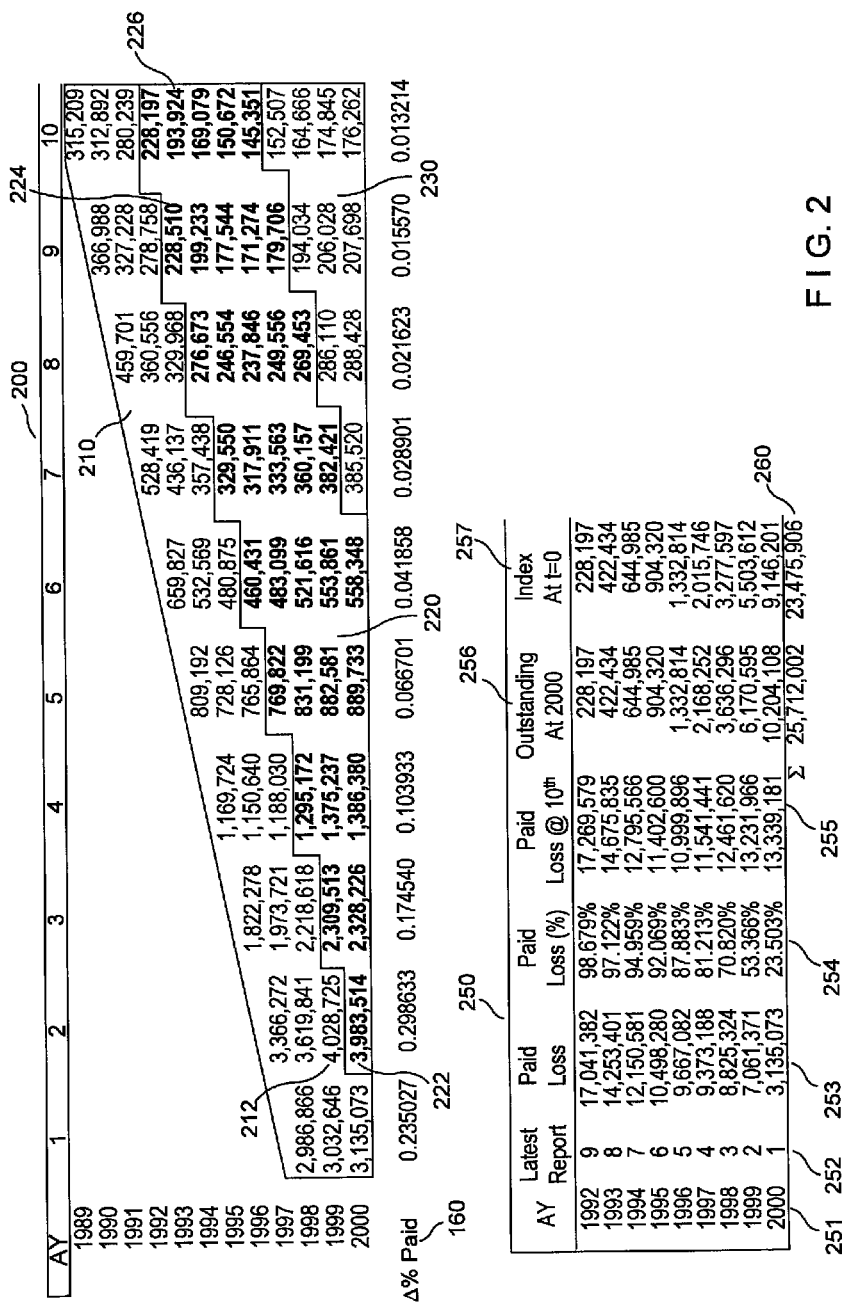
FIG. 2 shows an exemplary initial index based on projected payments over the next five calendar years using the data from FIG. 1 for the index year 2000.

FIG. 2 shows an exemplary initial index based on projected payments over the next five calendar years using the data from FIG. 1 for the index year 2000. Initially, it can be seen that the data presented in table 200 is incremental paid loss data rather than cumulative paid loss data as shown in FIG. 1. The actual incremental paid loss data is shown as data 210 and may be calculated using the cumulative paid loss data presented in FIG. 1. The calculation is performed, for each accident year, by subtracting the cumulative paid loss in previous development year from the current development year thereby resulting in the incremental paid loss for the current development year. To provide an example, to calculate the incremental paid loss value 212 of 4,028,725 for accident year 1999, development year 2, the cumulative paid loss value 174 for accident year 1999, development year 1, is subtracted from the cumulative paid loss value 172 for accident year 1999, development year 2 (7,061,371−3,032,646=4,028,725). The remaining incremental values 210 may be calculated in the same manner.

The table 200 also includes the projected incremental paid loss data 220 over the next five years. For example, the actual paid loss data for accident year 2000 only includes development year 1. However, projected incremental paid loss data for development years 2-6 is also included. As noted above, the projected incremental values may be calculated for any number of years from 1-9 for the purposes of the index, but in this example, the number of years has been selected to be five to match the term of the contract in this example. This projected paid loss data is calculated based on the data from FIG. 1 and illustrated in table 250 of FIG. 2. For example, as shown in table 250, for accident year 2000 (column 251), the cumulative paid loss from the latest report (development year 1, column 252) is 3,135,073 (column 253). This represents a cumulative percentage paid 150 value of 23.5030 of the total projected paid loss through development year 10 (column 254). Dividing the cumulative percentage paid 150 by the latest reported cumulative paid loss results in the cumulative projected paid loss through the tenth development year (column 255). In this example, the calculation is 3,135,073/0.23503=13,339,181. The cumulative projected paid loss value through the tenth report may then be multiplied by the incremental percentage paid factor 160 value for any development year to result in the projected incremental paid loss value for that development year. Continuing with the example of accident year 2000, the cumulative projected paid loss of 13,339,181 may be multiplied by the incremental percentage paid factor 160 value of 0.298633 for development year 2 to result in (13,339,181×0.298633=3,983,514) which is the incremental paid loss value 222 for accident year 2000, development year 2. The remaining projected incremental paid loss values 220 for other accident and development years may be calculated in the same manner as shown in table 250.

It is noted that table 200 also includes the incremental projected losses 230 for further years. These values were provided to complete the table, but are not necessary because, as stated above, it has been selected in this example to use the term of five years for the cover. It is also noted that the above calculations and further calculations presented below may include some rounding errors if it is attempted to reproduce these calculations from the values presented in FIGS. 1 and 2. These rounding errors add an insignificant amount of error to the calculations and do not affect the general intent of the index.

The table 250 also includes the base forecast 260 for the index. The base forecast 260 is the total projected payments over the next five calendar years for the most recent nine accident years. This value is calculated by summing the projected incremental paid losses 220 for each accident year through five calendar years as shown in column 257 and then summing all these values. For example, for accident year 1993, there are two development years of projected incremental losses shown as values 224 (228,510) and 226 (193,924), the sum of which is 422,434 as shown in column 257 of table 250. The summation of each of the calendar years results in the base forecast 260 value of 23,475,906. The index can be expressed as a ratio to the base forecast. Thus, the index is initially unity by construction. The base forecast 260 is considered to be the index value I(0)=1. The purpose of this index value will be described in greater detail below.

FIG. 3 shows an exemplary updated index based on updated actual payments and projected payments over the next four calendar years using the data from FIG. 1 for the index year 2000. Thus, in this example, it is time 1 year or the end of 2001 (Dec. 31, 2001). At this time, the actual paid losses 310 for calendar year 2001 have been added to the table 300. The remaining projected paid losses 320 are the same as the projected paid losses 220 from table 200.

The actual paid losses 310 from calendar year 2001 are different from the projected paid losses that were shown in table 200. Therefore, the summation of the actual paid losses for calendar year 2001 and the projected paid losses for the next four calendar years can be re-performed as shown in table 350. As shown, the summation for this updated forecast is the value 360 of 23,996,090, which is greater than the original base forecast 260 of 23,475,906. This updated forecast expressed as a ratio to the base forecast is the index value at year 1 I(1). I(1)=23,996,090/23,475,906=1.022. As each successive calendar year passes, a new index value may be calculated in a similar manner as a ratio to the base forecast 260.

FIG. 4 shows an exemplary updated index based on updated actual payments after five years for the index year 2000. The table 400 is for time 5 years or the end of 2005 Dec. 31, 2005). At this time, the actual paid losses 410 that correspond to the original projected paid losses 220 have occurred such that the actual values 410 are shown in table 400. Therefore, the summation of the actual paid losses for the 5 years may be performed as shown in table 450 resulting in the updated forecast 460 value of 27,130,311. Thus, since the exemplary product has a time horizon of five years, a Settlement Value of the index may be determined. The Settlement Value is the index value at year 5 expressed as a ratio to the base forecast, I(5), calculated in the same manner as described above, i.e., I(5)=27,130,311/23,475,906=1.156.

Now that the exemplary five years have expired, an exemplary commutation can be provided. It will be assumed that the conditions of the reinsurance contract have been met, e.g., the ABC insurance company reserves developed adversely from $500M to $700M, thus meeting the condition of a minimum $50M or 10% adverse development. In addition, as calculated above, the index value at year 5, I(5), exceeds the condition of being greater than an trigger point value of 1.1. As should be clear, if either or both of these conditions have not been satisfied, no commutation or payoff will be due ABC insurance company. However, this example has been provided to show how a commutation may be paid to ABC insurance company based on the purchased systemic risk product. It will also be assumed that the ABC insurance company has paid zero in the layer $200M excess of $600M. Otherwise, the Commutation Amount would be reduced for any loss recoveries that have already been made. The Commutation Amount (CA) may then be calculated using the formula provided above as follows:

$$CA=\text{Min}(\text{Max}(I(5)-1.1,0),0.1)\times \$2B$$

where, in this example,
I(5)=1.156
Index Trigger=1.1
Max (1.156−1.1,0)=0.056
Min (0.056, 0.1)=0.056
Company Paid in Layer=0
CA=0.056×$2B=$112M Therefore, in this exemplary embodiment, if ABC insurance company had purchased the systemic risk product based on the index as described above, and the losses developed in the exemplary manner described above, ABC insurance company would be entitled to a payoff of $112M after year 5.

As described above, the provided example is based on a reinsurance product. A similar ILW product may also be provided and calculated in the same manner described above for the reinsurance product. The normal difference between the reinsurance product and the ILW product is that the ILW product would typically not include the attachment limit (e.g., $200/$600) or the condition of adverse development on the purchaser of the cover and commutation amount will be based on:

$$CA=\text{Min}(\text{Max}(I(5)-1.1,0),0.1)\times \$2B$$

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the systems and methods for comparing company losses to industry indices may be a program containing lines of code stored on a non-transitory computer readable storage medium that, when compiled, may be executed on a processor.

Figure 5:
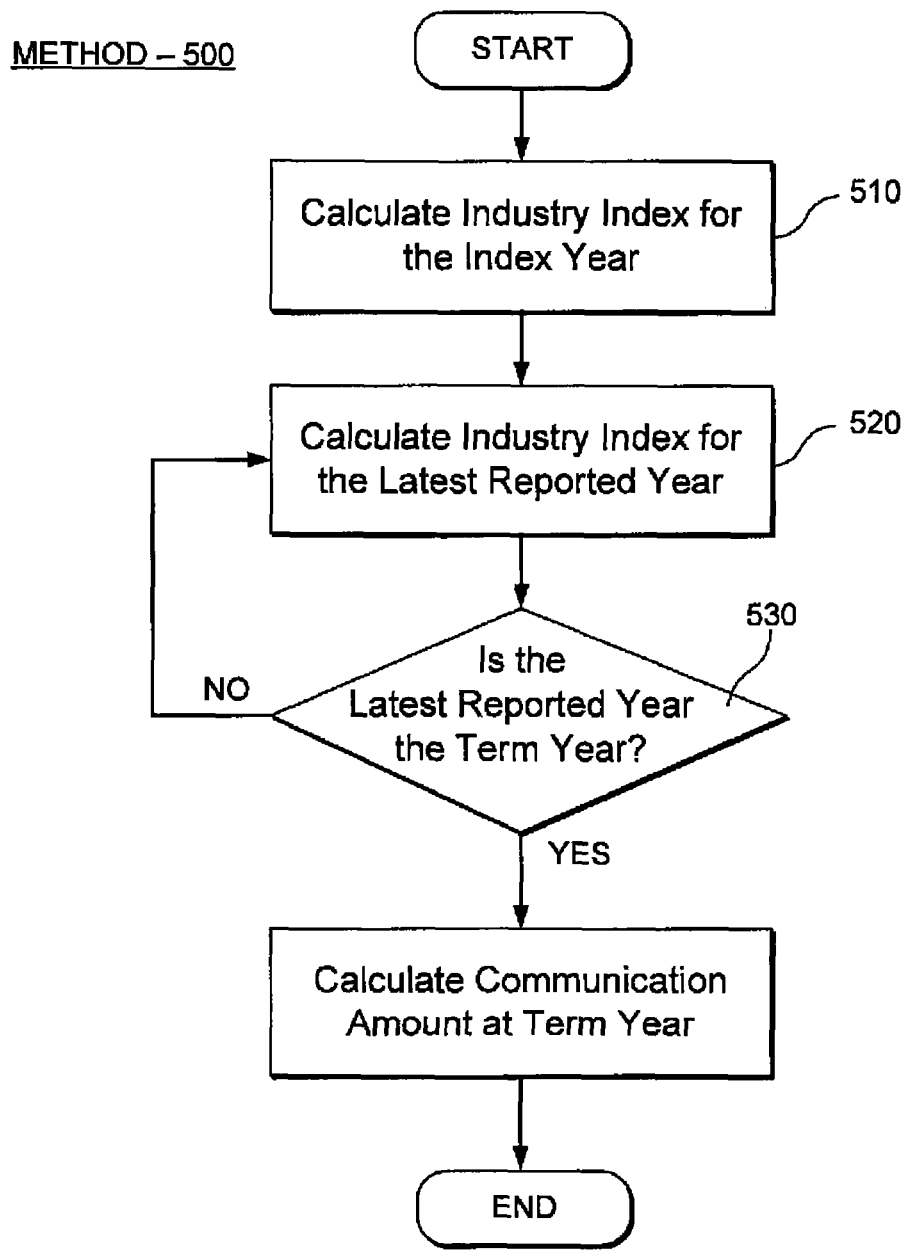
FIG. 5 illustrates an exemplary method for implementing the exemplary systemic risk product.

FIG. 5 illustrates an exemplary method 500 for implementing the exemplary systemic risk product. In step 510, an exemplary industry index for a selected index year is calculated based on the actual paid loss data from the Schedule P filings of the insurance companies that are included in the industry index. However, it is noted that the index is not limited to being calculated based on the actual paid loss, but may also be calculated based on other data reported in the Schedule P filings, e.g., case incurred loss, etc. The calculations of the industry index for exemplary index year 2000 were described above with reference to FIGS. 1 and 2. The industry index is based on the actual paid values and the paid estimates for the term of the systemic risk product. As described above, the base factor 260 that corresponds to an index value I(0)=1 is calculated.

In step 520, the index value at the latest reported year is calculated. In the example above, FIG. 3 and the related description describe calculating the index value I(1) for the latest reported year using the actual paid values for the latest reported year and the original projected values for the remainder of the term.

In step 530, it is determined whether the latest reported year was the term year. If the latest reported year was not the term year, the method loops back to step 520 to calculate the index value for the next reported year when that data becomes available. If the latest reported year was the term year, for example, the index value I(5) for a term of 5 years as calculated above with reference to FIG. 4, the method continues on to step 540.

In step 540, the commutation amount (CA) is calculated using the formula provided above. As described above, the values provided in the formula are based on the industry index and some values are based on values that are negotiated between the reinsurer and the insurance company purchasing the systemic risk product. As also described above, the commutation amount assumes that all other terms of the systemic risk product have been met (e.g., the dual triggers of the exemplary reinsurance product have been met).

An exemplary system may perform the steps of method 500. The exemplary system may comprise a receiving arrangement having hardware, software or a combination thereof that may, for example, receive the data necessary for performing the calculations of steps 510-540. The same system may also comprise a calculating arrangement having hardware, software or a combination thereof that may, for example, perform the calculations described with reference to steps 510-540. It is noted that the above-described arrangements are only exemplary and that the various arrangements may have its functionalities combined into a single component or distributed to multiple components. For example, the receiving arrangement and calculating arrangement may be implemented via the same computer code being executed on the same processor.

Throughout this description, it has been described that values from Schedule P for multiple insurance companies are used in the various calculations. However, since the values that are used in the calculations are spread out over multiple years of the reports, there may be inconsistencies between various years. The inconsistencies may be the result of, for example, mergers, acquisitions, rehabilitation, liquidation, distortions due to inter-company pooling or the insurance company's data clearly appears to be seriously distorted for reasons that are not readily apparent. Thus, the exemplary embodiments provide a series of rules for adjusting the inconsistencies.

FIGS. 6-10 illustrate a first example of an inconsistency correction. Initially, FIG. 6 shows a gross paid loss table 600 that has gross paid loss values from various annual reports. These values are used to calculate an incremental paid loss table 610. To provide a specific example, a gross loss value 602 (521) that is from a first annual report is subtracted from a gross loss value 604 (3,435) that is from a different annual report to result in the calculated incremental loss value 612 (2,914). Thus, for the calculation to be meaningful, the values taken from various annual statements should be consistent.

In one example, inconsistencies among annual statements may be determined based on gross premiums. For example, FIG. 7 illustrates a table 700 showing gross premiums on Dec. 31, 2004 that correspond to the same time periods as the gross loss values in table 600. As shown by this table 700, there is a slight inconsistency between 2003 and 2004 Annual Statements for accident year 2002. Specifically, the value 705 is 7,140 while the value 710 is 6,962. A factor can be calculated by dividing the value 710 by the value 705 resulting in (6,962/7,140=0.975). In this example, it has been determined that premium factors that fall within a tolerance level of 0.95 to 1.05 are considered minor inconsistencies that can be mechanically adjusted as described below. The range will be subject to negotiation.

An exemplary rule of applying a paid loss ratio development value is applied if the premium change is within the tolerance range (e.g., +/−5%). In this example, referring to table 600, the calculated 2nd to 3rd factor for accident year 2002 gross paid loss is the value 604 divided by the value 602 or 3,435/521=6.593. However, based on the rule described above, the paid loss ratio age-to-age factor is used as a proxy for the paid loss age-to-age factor. In this example, this value is calculated as: (gross paid loss value 604/premium value 710)/(gross paid loss value 602/premium value 705) or (3,435/6,962)/(521/7,140)=6.762. Equivalently, the original development factor of 6.593 may be adjusted by dividing it by the premium adjustment of 0.975 (6.593/0.975=6.762), yielding an adjusted development factor of 6.762.

FIG. 8 shows a table 800 that includes the age-to-age factors before adjustments, including the unadjusted age-to-age factor 805 (6.593) as calculated above. FIG. 8 also shows a table 810 that includes the age-to-age factors after adjustments, including the adjusted age-to-age factor 815 (6.762) as calculated above.

FIG. 9 shows the adjusted gross paid loss table 900 including the adjusted gross loss value 910 (3,523). As can be seen from the figures, the table 900 is identical to the table 600, except for the adjusted gross loss value 910. This value 910 is calculated by multiplying the previous year gross loss value 905 by the adjusted age-to-age factor 815 calculated above or 521×6.762=3,523.

FIG. 10 shows an adjusted incremental paid loss table 1000 including an adjusted incremental paid loss value 1010 (3,002). As can be seen from the figures, the table 1000 is identical to the table 610, except for the adjusted incremental loss value 1010. This value 1010 is calculated based on the adjusted gross loss value 910 minus the gross loss value 905 or 3,523−521=3,002. Thus, the above calculation shows one example of a rule for dealing with inconsistencies in annual reports.

The above example provided a rule if the inconsistency was within the tolerance range (e.g., +/−5%). The following example provides a rule for correcting an inconsistency that is greater than the tolerance range. Most of the companies or "combos" in the index are actually groups of affiliated companies. For example, combo 70 is the Travelers Group of Companies for which a consolidated annual statement is filed. Whenever possible, we make use of the consolidated group annual statements. In this example, for simplicity of explanation, it is considered that the group of companies filing a consolidated annual statement only consists of two companies, Company A and Company B. Those of skill in the art will understand that the principles of correcting for the inconsistencies described below may be extended to groups that are larger than two companies. In this example, the group accident year 2011 premium on annual statements 2011 is $500M and the group accident year 2011 premium on annual statements 2012 is $530M. Thus, this 6% discrepancy exceeds the example tolerance of +/−5%. Since the premium consistency check for the consolidated (group) annual statements fails, the same consistency check is applied to each individual company in the group. A weight is assigned to each company in the group based on the percentage of loss relative to that of all companies in the group. This results in a rule that if the combined weight of the matching companies in the group totals less than 90% of the "sum of the pieces", the age-to-age factor is flagged for later adjustment. An example of this process is provided below.

Again, in this example, there are only two companies in the group. Company A accident year 2011 premium on annual statement 2011 is $460M and accident year 2011 premium on annual statement 2012 is $450M. Company A passes the premium consistency check since the discrepancy is less than the exemplary 5%. Company A is a "matching" company. Company A accident year 2011 Paid Loss on annual statement 2011 is $46M and accident year 2011 Paid Loss on annual statement 2012 is $85.5M. Thus, the Company A development factor is (85.5/450)/(46/460)=1.9000.

Company B accident year 2011 premium on annual statement 2011 is $50M and accident year 2011 premium on annual statement 2012 is $85M. Company B accident year 2011 Paid Loss on annual statement 2011 is $5M and accident year 2011 Paid Loss on annual statement 2012 is $17M. Note that Company B premium changes by 70%, which exceeds the exemplary 5% tolerance. Since Company B fails the premium consistency check, we do not need to calculate the development factor. Company B is not a matching company.

The weight for Company A is determined based on dividing the Company A 2011 Paid Loss on annual statement 2011 by the sum of Company A and B 2011 Paid Loss on annual statement 2011 or $46/($46+$5)=90.2%. Since the combined weight of the matching companies in the group totals at least 90% (threshold subject to negotiation) of the "sum of the pieces", the age-to-age factor is not flagged for later adjustment. A default 1st-to-2nd factor for this group is calculated to be 2.02495. The calculation of this factor is explained in more detail below. The deemed 1st-to-2nd factor is then calculated by multiplying the Company A weight by the Company Development factor and then adding the product of (1−the Company A weight) times the default 1st-to-2nd factor or 90.2%×1.900+(1−90.2%)×2.02495=1.912.

Again in this example, suppose that $1^{st}$ report paid loss for the group as reported on the 2011 annual statement is $52 million. Applying the 1.912 factor derived above to $52 million $1^{st}$ report loss yields $99.424 million—which we deem to be the actual accident year 2011 paid loss at a $2^{nd}$ report. This figure may not equal the amount actually reported on the 2012 annual statement.

In another example, the observed consolidated factor fails consistency check and the combined weight of the matching companies in the group totals less than 90% of the "sum of the pieces" In this case, the age-to-age factor cannot be calculated accurately and the deemed development factor will be based on a default factor. This example will be described with reference to FIGS. 11A and 11B that show a table 1100 incorporating the described calculations. For each accident year and age a weighted average age-to-age factor is calculated across all companies in the basket using only the un-flagged factors. A default age-to-age factor for each company at each age is then calculated by applying the negotiated adjustment factors (from a table) to the base weighted average factor. The table lists report adjustment factors for the companies in the index. Although the factors are subject to negotiation, they are intended to capture idiosyncratic development for each combo relative to industry development. Column (5) 1125 lists the negotiated adjustment factors for the entities (combos of column (1) 1105).

For example, Combo 70 (as shown in row 1150) has a first report Adjustment Factor of 0.81 (column (5) 1125). This means that it is expected that the $1^{st}$-to-$2^{nd}$ development factor for Combo 70 to be about 81% of the industry factor; that is, historically, Combo 70's first report factor has been approximately 81% of the industry factor. Suppose the accident year 2011 weighted average 1st-to-2nd factor turns out to be 2.5000. As described above, only groups of companies that are not flagged for inconsistencies are included in the average. As shown in this example, a weighted average of the non-flagged development factors in column (4) 1120 yields the average factor of 2.500 (value 1155); that is, the average factor, 2.500, equals the sum of column (3) 1115 (value 1160—9,103,455) divided by the sum of column (2) 1110 (value 1165—3,641,378). Then the default 1st-to-2nd factor for Combo 70, would be 0.81×2.5000=2.025 as shown in column (6) 1130. Thus, if the actual data needed to calculate a $1^{st}$-to-$2^{nd}$ factor for this Combo becomes unusable due to a reporting inconsistency between the successive annual statements, the default value of 2.025 may be used as a proxy for the unusable factor.

For each entity in column (1) 1105, a default factor is calculated as the product of the adjustment factor in column (5) 1125 and the average factor of 2.5 (value 1155). Each of the default factors are listed in column (6) 1130.

Continuing with the example of Combo 70 started above, it may be considered that the actual accident year 2011 1st-to-2nd factor for Combo 70 turns out to be 2.00000, so that the percent difference between actual and default is a deviation of 12.3%=(2.000000−2.025)/2.025. As described above, a default factor is estimated for each of the companies that have not been flagged and compared to the actual age-to-age factors. The two observations with the largest deviations and the two with the lowest are flagged. If an observation has been flagged, the age-to-age factor is set to the company default factor for that age (e.g., 2.6523 for Combo 914 in row 1170). The intent is to reduce the sensitivity of the index to extreme data points. Otherwise, the age-to-age factor is set to the observed factor (2.00 for Combo 70). Note that the default factor is sensitive to systemic risk since it is based on the average factor for a group of companies.

In another example, two companies may merge or one company may acquire another company. If the companies being merged are both in the reference portfolio, age-to-age factors can be calculated based on the combined entity. This entails constructing an as-if combined Schedule P Part I for the calendar year prior to the merger. For example, Company A merges with Company B during 2010. A combined Annual Statement in 2010 is filed. For accident year 2009 the first annual statement in 2009 shows a paid loss of $2M of Company A and $3M for company B. For accident year 2009, the second annual report in 2010 shows a paid loss of $6M for the combined Company A+B. The 1st-to-2nd factor is thus $6M/5M=1.20. Thus, the deemed incremental paid for accident year 2009-calendar year 2010 is calculated as cumulative deemed paid through Dec. 31, 2009 times (1.20−1) which is $400K for A; $600K for B.

If one of the companies being merged is not in the reference portfolio but files annual statements, age-to-age factors can be calculated based on the combined entity. This entails constructing an as-if combined Schedule P Part I for the calendar year preceding the merger. In some cases, companies may file both a post-merger consolidated annual statement and individual company annual statements, making it possible to calculate age-to-age factors for the companies originally in the portfolio. The principle is to use the figures that best match the original entity. If the company being acquired is relatively small, the resulting distortion may be within the negotiated (e.g. 5%) tolerance level, resulting in a mechanical adjustment as described above.

If a company in the index stops reporting reliable annual statements due to rehabilitation or liquidation, the calculation agent will select a similar company or basket of companies of comparable volume to serve as a proxy in the calculation of age-to-age factors. Previously calculated age-to-age factors remain unchanged.

If the calculation yields a negative incremental paid, the age-to-age factor is flagged and deemed to be an error. The default age-to-age factors for all company-age combinations are subject to a minimum of unity.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    calculating, by a processor, a first industry index amount at an index year based on (i) selected actual loss values for the index year for a plurality of companies in a defined line of business, (ii) selected actual loss values for a predetermined number of years preceding the index year for the plurality of companies in the defined line of business, and (iii) loss estimates for a number of years subsequent to the index year corresponding to a predetermined term of a systemic risk product for the plurality of companies in the defined line of business;
    calculating, by the processor, a second industry index amount based on (i) the selected actual loss values for the index year for the plurality of companies in the defined line of business, (ii) the selected actual loss values for the predetermined number of years preceding the index year for the plurality of companies in the defined line of business, and (iii) selected actual loss values for at least one year subsequent to the index year for the plurality of companies in the defined line of business, wherein the at least one year subsequent to the index year is equal to the predetermined term of the systemic risk product;
    calculating, by the processor, an industry index value based on the first and second industry index amounts; and
    calculating a settlement amount based on the industry index value, an index trigger and an index limit,
    wherein the systemic risk product is a reinsurance product and the settlement amount is calculated based on:

Settlement Amount=(Min(Max(industry index value−index trigger, 0), index limit) times a scalar to convert industry index value to monetary value)−an amount paid by a buyer of the systemic risk product in a layer, wherein the index trigger, the index limit, the scalar and the layer are terms of the systemic risk product.

2. The method of claim 1, wherein the defined line of business is based on a Schedule P defined line of business, wherein the Schedule P is a National Association of Insurance Commissioners (NAIC), Annual Statement schedule, wherein the Schedule P includes defined lines of business.

3. The method of claim 1, wherein the selected actual loss values for the index year are one of actual paid loss values and case reserved loss values from Schedule P filings for the plurality of companies, wherein the Schedule P filings are a National Association of Insurance Commissioners (NAIC), Annual Statement schedule, wherein each Schedule P includes ten years worth of paid loss data.

4. The method of claim 1, wherein the predetermined term is any of one year to nine years.

5. The method of claim 1, wherein the selected actual loss values for the index year and the loss estimates are one of gross losses or net losses.

6. The method of claim 1, further comprising:
    determining a portion of the selected actual loss values for the predetermined number of years preceding the index year for adjustment based on a consistency check; and
    adjusting, prior to calculating the first and second industry indices, the portion of the selected actual loss values for the predetermined number of years preceding the index year.

7. The method of claim 1, wherein calculating the second industry index comprises:
    calculating an interim industry index amount based on the selected actual loss values for the index year for the plurality of companies, the predetermined number of years preceding the index year for the plurality of companies and at least one year subsequent to the index year; and
    calculating a final industry index amount based on the selected actual loss values for the index year for the plurality of companies, the predetermined number of years preceding the index year for the plurality of companies and the number of years subsequent to the index year corresponding to the predetermined term of the systemic risk product,
    wherein the industry index value is calculated based on the first, interim and final industry index amounts.

8. A method, comprising:
    calculating, by a processor, a first industry index amount at an index year based on (i) selected actual loss values for the index year for a plurality of companies in a defined line of business, (ii) selected actual loss values for a predetermined number of years preceding the index year for the plurality of companies in the defined line of business, and (iii) loss estimates for a number of years subsequent to the index year corresponding to a predetermined term of a systemic risk product for the plurality of companies in the defined line of business;
    calculating, by the processor, a second industry index amount based on (i) the selected actual loss values for the index year for the plurality of companies in the defined line of business, (ii) the selected actual loss values for the predetermined number of years preceding the index year for the plurality of companies in the defined line of business, and (iii) selected actual loss values for at least one year subsequent to the index year for the plurality of companies in the defined line of business, wherein the at least one year subsequent to the index year is equal to the predetermined term of the systemic risk product;

calculating, by the processor, an industry index value based on the first and second industry index amounts; and calculating a settlement amount based on the industry index value, an index trigger and an index limit, wherein the systemic risk product is an industry loss warrant product and the settlement amount is calculated based on:

Settlement Amount=Min(Max(industry index value–index trigger, 0), index limit) times a scalar to convert industry index value to monetary value, wherein the index trigger, the index limit, and the scalar are terms of the systemic risk product.

9. A system, comprising:
a memory storing a set of instructions; and
a processor executing the set of instructions to perform operations comprising:
calculating a first industry index amount at an index year based on (i) selected actual loss values for the index year for a plurality of companies in a defined line of business, (ii) selected actual loss values for a predetermined number of years preceding the index year for the plurality of companies in the defined line of business, and (iii) loss estimates for a number of years subsequent to the index year corresponding to a predetermined term of a systemic risk product for the plurality of companies in the defined line of business;
calculating a second industry index amount based on (i) the selected actual loss values for the index year for the plurality of companies in the defined line of business, (ii) the selected actual loss values for the predetermined number of years preceding the index year for the plurality of companies in the defined line of business, and (iii) selected actual loss values for at least one year subsequent to the index year for the plurality of companies in the defined line of business, wherein the at least one year subsequent to the index year is equal to the predetermined term of the systemic risk product;
calculating an industry index value based on the first and second industry index amounts; and
calculating a settlement amount based on the industry index value, an index trigger and an index limit,
wherein the systemic risk product is a reinsurance product and the settlement amount is calculated based on:

Settlement Amount=(Min(Max(industry index value–index trigger, 0), index limit) times a scalar to convert industry index value to monetary value)–an amount paid by a buyer of the systemic risk product in a layer, wherein the index trigger, the index limit, the scalar and the layer are terms of the systemic risk product.

10. The system of claim 9, wherein the defined line of business is based on a Schedule P defined line of business, wherein the Schedule P is a National Association of Insurance Commissioners (NAIC), Annual Statement schedule, wherein the Schedule P includes defined lines of business.

11. The system of claim 9, wherein the selected actual loss values for the index year are one of actual paid loss values and case reserved loss values from Schedule P filings for the plurality of companies, wherein the Schedule P filings are a National Association of Insurance Commissioners (NAIC), Annual Statement schedule, wherein each Schedule P includes ten years worth of paid loss data.

12. The system of claim 9, wherein the predetermined term is any of one year to nine years.

13. The system of claim 9, wherein the selected loss actual values for the index year and the loss estimates are one of gross losses or net losses.

14. The system of claim 9, wherein the method further comprises:
determining a portion of the selected actual loss values for the predetermined number of years preceding the index year for adjustment based on a consistency check; and
adjusting, prior to calculating the first and second industry indices, the portion of the selected actual loss values for the predetermined number of years preceding the index year.

15. The system of claim 9, wherein the method further comprises:
calculating an interim industry index amount based on the selected actual loss values for the index year for the plurality of companies, the predetermined number of years preceding the index year for the plurality of companies and at least one year subsequent to the index year; and
calculating a final industry index amount based on the selected actual loss values for the index year for the plurality of companies, the predetermined number of years preceding the index year for the plurality of companies and the number of years subsequent to the index year corresponding to the predetermined term of the systemic risk product,
wherein the industry index value is calculated based on the first, interim and final industry index amounts.

16. A system, comprising:
a memory storing a set of instructions; and
a processor executing the set of instructions to perform operations comprising:
calculating a first industry index amount at an index year based on (i) selected actual loss values for the index year for a plurality of companies in a defined line of business, (ii) selected actual loss values for a predetermined number of years preceding the index year for the plurality of companies in the defined line of business, and (iii) loss estimates for a number of years subsequent to the index year corresponding to a predetermined term of a systemic risk product for the plurality of companies in the defined line of business;
calculating a second industry index amount based on (i) the selected actual loss values for the index year for the plurality of companies in the defined line of business, (ii) the selected actual loss values for the predetermined number of years preceding the index year for the plurality of companies in the defined line of business, and (iii) selected actual loss values for at least one year subsequent to the index year for the plurality of companies in the defined line of business, wherein the at least one year subsequent to the index year is equal to the predetermined term of the systemic risk product;
calculating an industry index value based on the first and second industry index amounts; and
calculating a settlement amount based on the industry index value, an index trigger and an index limit, wherein the systemic risk product is an industry loss warrant product and the settlement amount is calculated based on the following equation:

Settlement Amount=Min(Max(industry index value−index trigger, 0), index limit) times a scalar to convert industry index value to monetary value, wherein the index trigger, the index limit, and the scalar are terms of the systemic risk product.

17. A non-transitory computer readable storage medium with an executable program stored thereon, wherein the program instructs a processor to perform the following steps:

calculating a first industry index amount at an index year based on (i) selected actual loss values for the index year for a plurality of companies in a defined line of business, (ii) selected actual loss values for a predetermined number of years preceding the index year for the plurality of companies in the defined line of business, and (iii) loss estimates for a number of years subsequent to the index year corresponding to a predetermined term of a systemic risk product for the plurality of companies in the defined line of business;

calculating a second industry index amount based on (i) the selected actual loss values for the index year for the plurality of companies in the defined line of business, (ii) the selected actual loss values for the predetermined number of years preceding the index year for the plurality of companies in the defined line of business, and (iii) selected actual loss values for at least one year subsequent to the index year for the plurality of companies in the defined line of business, wherein the at least one year subsequent to the index year is equal to the predetermined term of the systemic risk product;

calculating an industry index value based on the first and second industry index amounts, and calculating a settlement amount based on the industry index value, an index trigger and an index limit, wherein the systemic risk product is a reinsurance product and the settlement amount is calculated based on:

Settlement Amount=(Min(Max(industry index value−index trigger, 0), index limit) times a scalar to convert industry index value to monetary value)−an amount paid by a buyer of the systemic risk product in a layer, wherein the index trigger, the index limit, the scalar and the layer are terms of the systemic risk product.

18. The non-transitory computer readable storage medium of claim 17, wherein the steps further comprise:

determining a portion of the selected actual loss values for the predetermined number of years preceding the index year for adjustment based on a consistency check; and adjusting, prior to calculating the first and second industry indices, the portion of the selected actual loss values for the predetermined number of years preceding the index year.

19. The non-transitory computer readable storage medium of claim 17, wherein the steps further comprise:

calculating an interim industry index amount based on the selected actual loss values for the index year for the plurality of companies, the predetermined number of years preceding the index year for the plurality of companies and at least one year subsequent to the index year; and calculating a final industry index amount based on the selected actual loss values for the index year for the plurality of companies, the predetermined number of years preceding the index year for the plurality of companies and the number of years subsequent to the index year corresponding to the predetermined term of the systemic risk product, wherein the industry index value is calculated based on the first, interim and final industry index amounts.

* * * * *